No. 694,920. Patented Mar. 4, 1902.
D. H. HOUSTON.
CAMERA.
(Application filed Mar. 12, 1897.)
(No Model.)
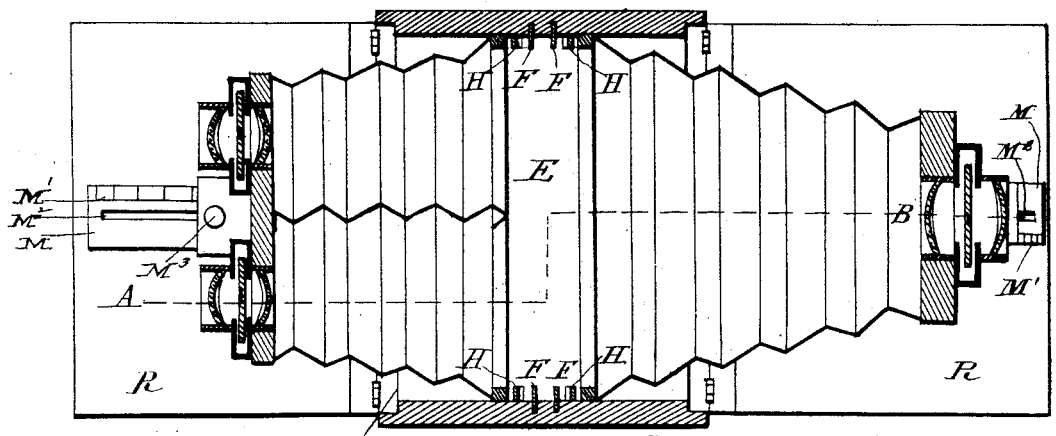
Fig. 1.
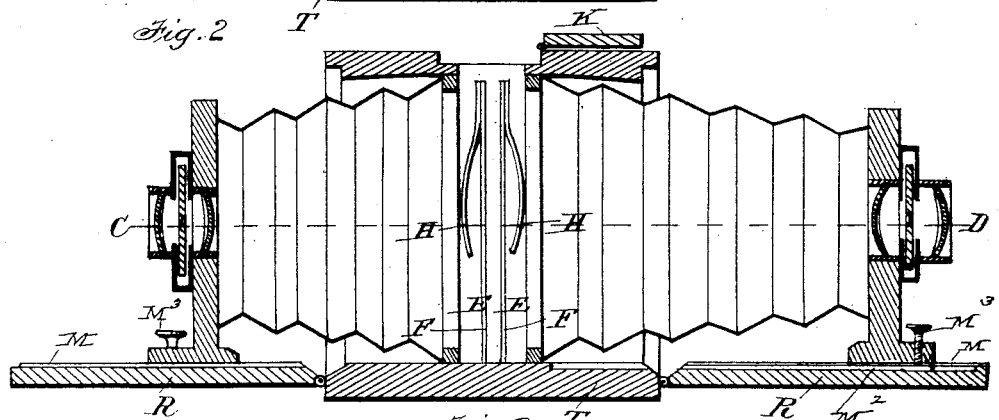
Fig. 2.
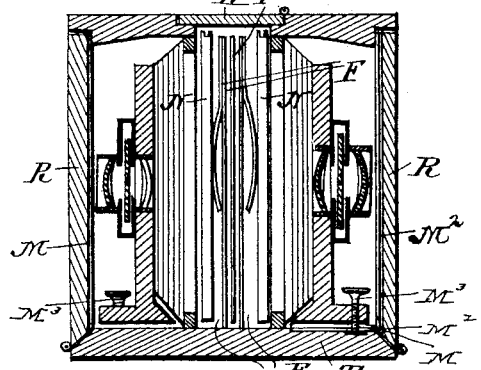
Fig. 3.
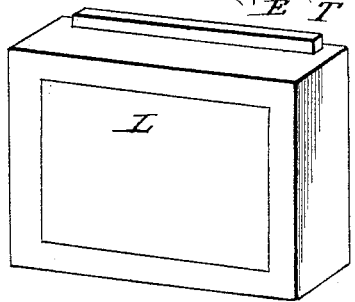
Fig. 4.
WITNESSES
Franck L. Ourand
D. P. Moore
David H. Houston
INVENTOR
by 
Attorney
THE NORRIS PETERS CO., PHOTO-LITHO., WASHINGTON, D. C.

UNITED STATES PATENT OFFICE.

DAVID H. HOUSTON, OF HUNTER, NORTH DAKOTA.

CAMERA.

SPECIFICATION forming part of Letters Patent No. 694,920, dated March 4, 1902.

Application filed March 12, 1897. Serial No. 627,093. (No model.)

*To all whom it may concern:*

Be it known that I, DAVID H. HOUSTON, a citizen of the United States, residing at Hunter, in the county of Cass and State of North Dakota, have invented certain new and useful Improvements in Cameras; and I do hereby declare the following to be a full, clear, and exact description of the invention, such as will enable others skilled in the art to which it appertains to make and use the same.

My invention relates to photographic cameras, and has for its object the construction of a compact camera carrying lenses on two opposite sides, whereby the camera is adapted to do a variety of work, such as ordinary views and stereoscopic views or views of ordinary angle and views of wide angle.

The camera has a central portion for exposing the sensitized surfaces to the actinic action of light passed through the lenses and lenses adapted to do special work, mounted so as to be focused in at one side of the camera, and lenses adapted to do a different class of work, mounted so as to be focused in at the opposite side of the camera, whereby a combined capacity of two cameras of different qualifications is had in one compact piece of apparatus having one central exposing portion.

My invention further combines a construction at once novel and useful, and by said construction the lens or lenses on one side can be focused as a magnifying-glass upon the focusing-surface, and said lenses can be utilized to look through to observe the focusing of the lens or lenses on the opposite side of the camera, whereby a separate focusing-glass and a focusing-cloth are simultaneously dispensed with.

Figure 1 is a central sectional plan view of the camera extended, taken on the line C D of Fig. 2. Fig. 2 is a longitudinal vertical sectional view of the camera extended, taken on the line A B of Fig. 1. Fig. 3 is a vertical cross-sectional view of the camera closed, taken on the line A B of Fig. 1. Fig. 4 is a perspective view of a roll-holder that may be used with my camera.

Similar letters of reference refer to similar parts in all of the views.

My invention comprises a camera which may be constructed with opposite sides R, folding outwardly from one base T, and a bellows W on opposite sides, extending outwardly from a central portion E. Said portion E may have partial divisions F, carrying springs H, Fig. 2, which springs H press outwardly upon the holders N, Fig. 3, or focusing-frame P, as the case may be. Between the partial divisions F the reversible focusing frame and glass P can be stored when not in use, as seen in Fig. 3, and on opposite sides of the focusing-glass the plate-holders N can be carried ready for use, as seen in Fig. 3, which plate-holders can be inclosed by the light-tight central cover K. For the purpose of adjusting and indicating the extent of projection of the lenses I arrange centrally upon each of the hinged sides of the casing the plates M, provided each with graduated scale M' and having a channel $M^2$, which receives the adjusting-screw $M^3$, and by means of this construction it will be readily understood that the lenses can be adjusted to any desired projection. A roll-holder L for using a rollable sensitized film can be substituted for the plate or cut-film holders, and the roll-holder can be reversed in the central portion, so as to receive impressions through lenses on either of two opposite sides of the camera, as desired.

I am well aware that the construction of many parts of my invention may be of any general construction at present used in the manufacture of cameras; but I claim as my invention the combination of parts as more explicitly set forth in the claims forming part of this specification.

I claim as my invention—

1. In a photographic camera the combination of a casing having a central portion adapted for holding and exposing sensitized photographic surfaces to the actinic action of light passed through lenses, a light-tight cover on the said central portion, extensible bellows attached on opposite sides of the said central portion, two sides of the casing folding outwardly and forming with the base of the casing a continuous base adapted to support said bellows when extended, lenses mounted on the front end of said bellows, and means whereby said lenses can be adjusted to focus on sensitized photographic surfaces in said central portion of said camera.

2. In a photographic camera the combination of a casing having a central portion adapted for holding and exposing sensitized photographic surfaces to the actinic action of light passed through lenses, a light-tight cover on the said central portion, folding sides hinged to the base of said casing and adapted to form with the base of the casing a continuous base, a divided bellows connected at its inner end to one side of said central portion, a pair of lenses of equal foci mounted and connected to the outer end of the divided bellows, a lens mounted and connected to the outer end of the single bellows, and means for supporting, adjusting, and indicating the extent of projection of said lenses.

3. In a photographic camera the combination of a casing having two of its opposite sides folding outwardly, said folding sides adjustable to form one rigid continuous base with the bottom of the camera-casing, a central portion in said casing fitted to hold sensitized-surface holders, said central portion having an opening adapted to admit the said holders, a light-tight door closing said opening, bellows attached at opposite interior sides of the said central portion, said bellows extensible outwardly on opposite sides of the casing, lenses mounted to close the outer ends of the bellows, and means for adjusting the focal position of the lenses to focus upon sensitized surfaces in the central portion of the casing.

4. In a photographic camera the combination of a casing having a central portion adapted to receive holders for sensitized surfaces, said central portion having stops on opposite sides of the said central portion, an opening in said central portion adapted to admit the said holders, said stops adapted to limit the position of the holders and stay the said holders at opposite sides of the said central portion, a door closing said opening in the central portion, folding sides hinged to the casing on two opposite sides, said folding sides fitted into the casing, said folding sides adapted to fold outwardly and form a continuous base with the bottom of the camera-casing, said continuous base fitted to support standards carrying lenses connected to the outer ends of the bellows, and said standards adjustable upon the folding sides when opened outwardly.

In testimony whereof I affix my signature in presence of two witnesses.

DAVID H. HOUSTON.

Witnesses:
WM. N. MOORE,
C. A. NEALE.